INVENTORS.
PETER HUNSINGER
JAMES C. WHITE

Feb. 6, 1973  P. HUNSINGER ET AL  3,715,067
APPARATUS FOR MANUFACTURING SLIDE COVERS
Filed Feb. 16, 1971  5 Sheets-Sheet 2

INVENTOR
PETER HUNSINGER
JAMES C. WHITE
BY
ATTORNEY

INVENTORS.
PETER HUNSINGER
JAMES C. WHITE

United States Patent Office 3,715,067
Patented Feb. 6, 1973

3,715,067
APPARATUS FOR MANUFACTURING SLIDE COVERS
Peter Hunsinger, Brooklyn, N.Y., and James C. White, Rutherford, N.J., assignors to Propper Manufacturing Company, Inc.
Filed Feb. 16, 1971, Ser. No. 115,211
Int. Cl. B26f 3/00
U.S. Cl. 225—96.5      4 Claims

ABSTRACT OF THE DISCLOSURE

Slide covers and method and apparatus for manufacturing the same. The slide cover is made of a transparent material such as glass and has a smooth, polished surface. An elongated blank the length of which is several times that of the slide covers is fed by a suitable feeding structure through and beyond a cutting location until a leading end of the blank is situated at a distance beyond the cutting location equal to the required length of the slide cover. A control assembly then automatically terminates the feeding of the blank and a cutting structure cuts across the blank at the cutting location so that a slide cover of predetermined length is separated from the blanks, whereupon this cycle of operations is automatically repeated. The elongated blanks from which the slide cutters are derived are fed automatically one after the other through and beyond the cutting location where the above operations take place. As the slide covers are cut from the blanks they are collected at a collecting station where a predetermined number of the slide covers are collected. Upon reaching this predetermined number the operations are automatically terminated until the collected predetermined number of covers are removed from the collecting location, whereupon the above cycle of operations then automatically starts again.

BACKGROUND OF THE INVENTION

The present invention relates to slide covers.

Thus, as is well known, when a specimen is placed on a slide to be examined under a microscope, the specimen is first covered by a slide cover. At the present time these slide covers are manufactured with almost entirely manual operations, so that the costs thereof are relatively high because of the labor requirements. In addition, the slide covers as conventionally manufactured do not have smooth, polished surfaces, so that they detract from the quality of the image which is seen in a microscope.

SUMMARY OF THE INVENTION

It is accordingly a primary object of the present invention to provide slide covers superior to those which have heretofore been provided and to additionally provide a slide cover manufacturing method and apparatus which will avoid the above drawbacks.

Thus, it is an object of the invention to provide a method and apparatus which are almost fully automatic, so that the labor costs are greatly reduced and thus the costs of the slide covers are lessened.

Also, it is an object of the present invention to provide a method and apparatus capable of achieving a high output of precisely dimensioned slide covers of high quality.

In addition it is an object of the present invention to provide a fully automatic method and apparatus of the above type which involves the use of relatively simple rugged elements which are low in cost, so that the costs involved in providing an apparatus of the invention and carrying out the method of the invention are relatively low.

The method and aparatus of the invention are capable of producing slide covers of the present invention which are characterized by perfectly clean, smooth, polished surfaces, so that the quality of the image seen in a microscope will not be deleteriously affected by the slide cover. With the method of the invention an elongated blank whose length is several times the predetermined length of each slide cover is fed through and beyond a given cutting location until a leading end of the blank is situated beyond the cutting location by a distance equal to the predetermined length required for the slide cover. Then the feeding of the blank is terminated and a cutting takes place across the blank at the cutting location to cut from the blank a slide cover having the predetermined length. This slide cover is received at a collecting location where the successive slide covers are collected until a predetermined number thereof are collected. As soon as a slide cover is cut from a blank the feeding operation again takes place, so that through the intermittent feeding alternating with the cutting steps the slide covers are automatically produced. When a predetermined number of slide covers have collected at the collecting station, the feeding and cutting steps are automatically terminated until the collected slide covers are removed, whereupon the feeding and cutting steps again start automatically. The feeding means and cutting means of the invention are alternately operated in a fully automatic manner one after the other during each operating cycle as the result of a control means which is actuated by the leading end of the blank itself. A weighing means weighs the collected slide covers so that when a predetermined number of slide covers are collected at the collecting station the weight will reach a given value to which the control means responds for terminating the operation of the feeding means and cutting means until the predetermined number of slide covers are removed from the collecting location, whereupon the control means again responds to start the feeding and cutting operations in a fully automatic manner. As the elongated blanks are fed by the feeding means these blanks are engaged by rotary brushes which provide the slide covers with the smooth polished surfaces.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
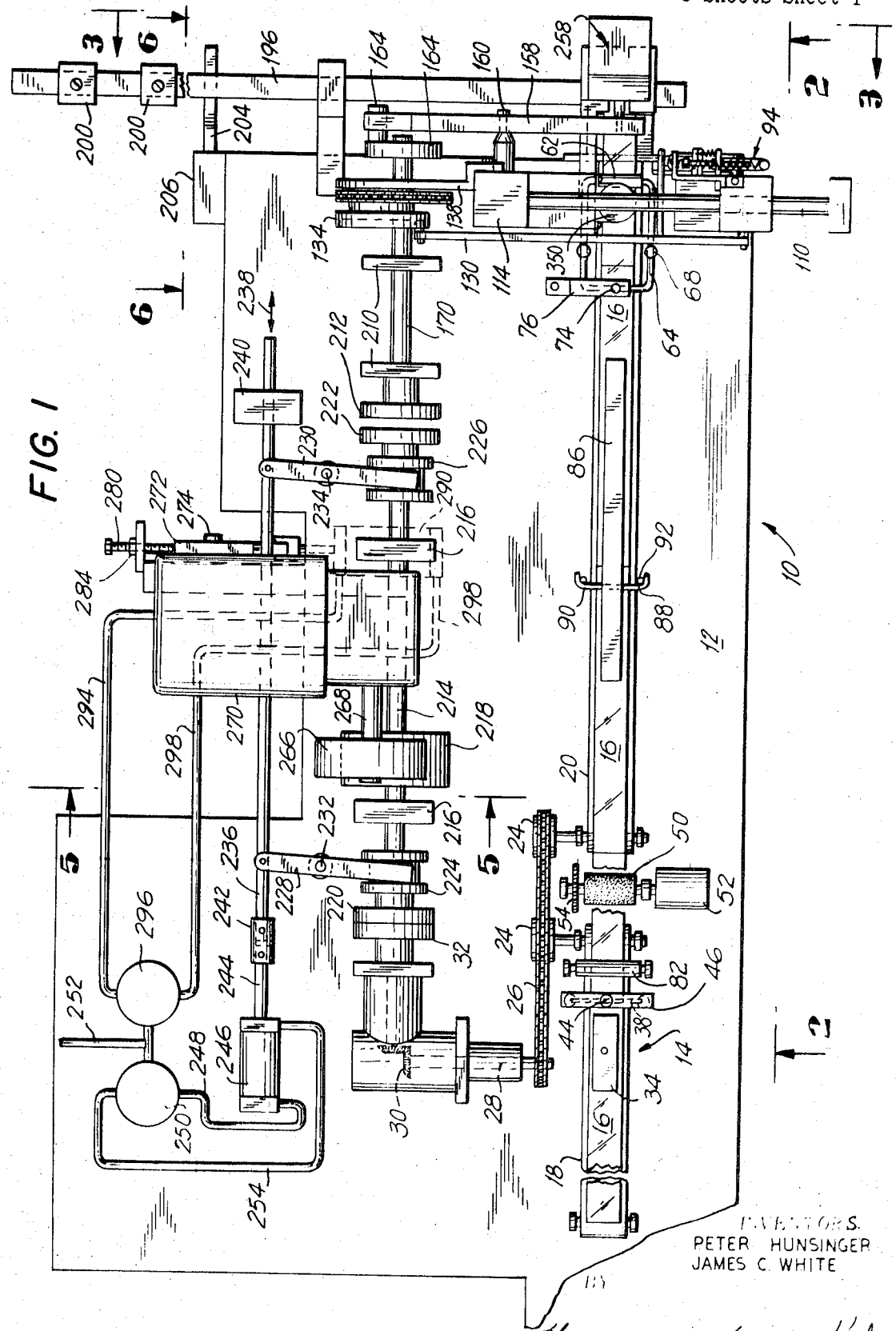
FIG. 1 is a top plan view of an apparatus of the invention for performing the method of the invention.

Referring to FIG. 1, the entire apparatus 10 of the invention is mounted on any suitable base plate 12 which may be supported on a table, for example. This base 12 carries a feeding means 14 serving to feed elongated blanks 16 to a cutting location referred to below. As is apparent from FIGS. 1 and 2, the feeding means 14 includes a left endless belt 18 and a right endless belt 20 which receives the blanks 16 from the belt 18. These belts are supported for movement on any suitable rollers or pulleys supported for rotation on shafts carried by suitable standards 22. As is indicated in FIG. 1, the right pulley which carries the belt 18 and the left pulley which carries the belt 20 have their shafts respectively fixed to sprocket wheels 24 driven by a chain 26. The chain 26 is driven from a sprocket which is fixed to a rotary shaft 28 supported for rotary movement in any suitable bearing carried by a standard mounted on the base 12. This shaft 28 is driven through bevel gears 30 from a driven clutch member 32 referred to below.

Figure 2:
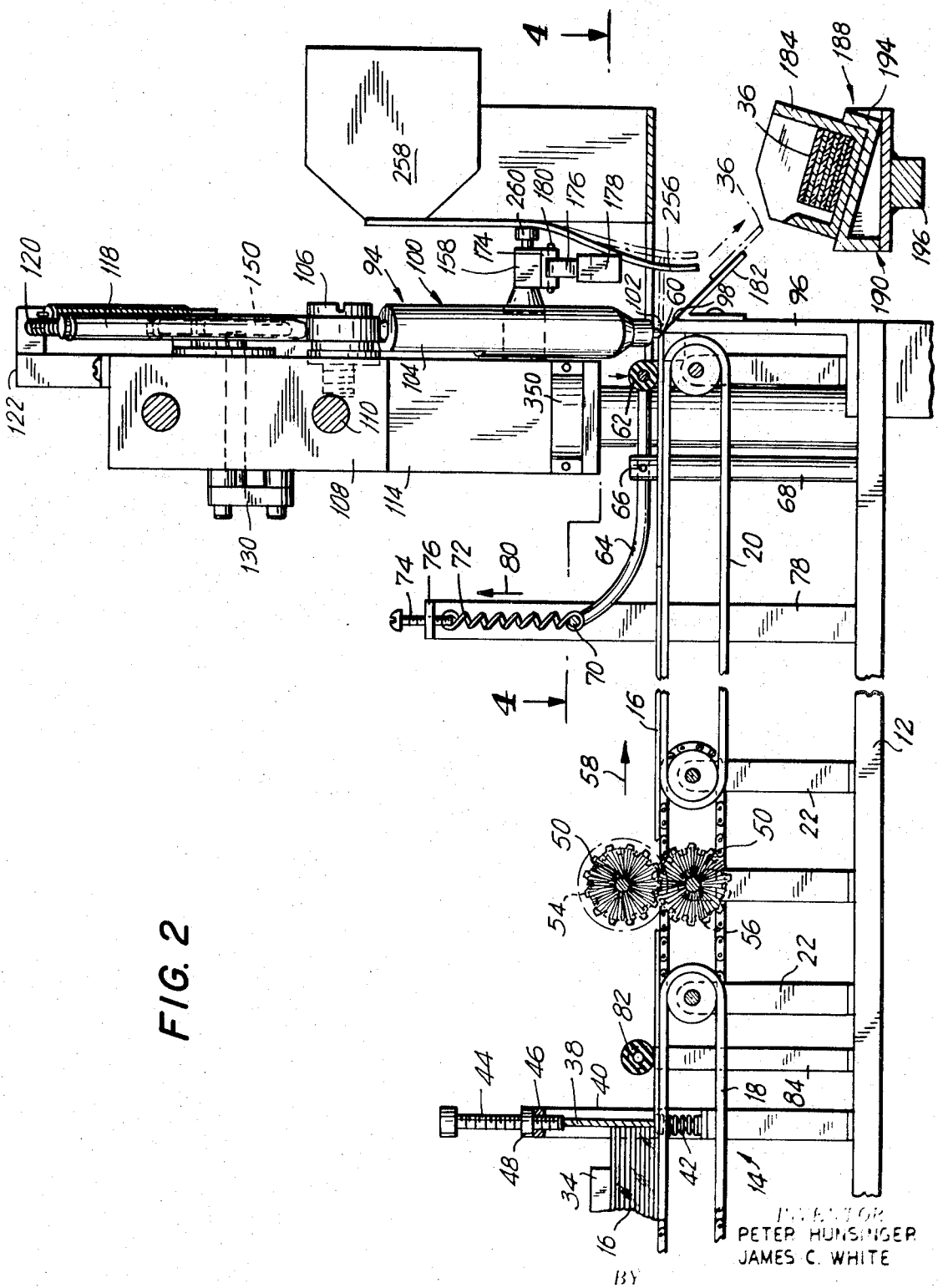
FIG. 2 is a front partly sectional elevation taken along line 2—2 of FIG. 1 in the direction of the arrows, with part of the structure broken away, FIG. 2 showing the structure at a scale which is larger than that of FIG. 1.

The elongated blanks 16 are arranged on the belt 18 in the form of a suitable supply stack shown most clearly at the left of FIG. 2. A weight 34 is placed on top of the stack of blanks 16. It is from these blanks that the slide covers 36 shown at the right of FIG. 2 are cut. Each blank 16 has a predetermined width corresponding to the width of the slide cover 36 and a length several times greater than the length of each slide cover 36, the length of each blank 16 being a multiple of the predetermined length of the slide covers 36, so that a given whole number of complete slide covers 36 are cut from each blank 16.

The blanks 16 are fed one after the other to the cutting location which is situated at the region of the upper right end of the belt 20, as viewed in FIG. 2. Thus, as is shown at the left of FIG. 2, a gate 38 is located over the upper run of the belt 18 with the bottom edge of the gate situated above the upper run of belt 18 by a distance equal to the thickness of each blank 16. The gate 38 is guided for vertical movement in grooves of vertically extending guides 40, and springs 42 are situated beyond the belt 18 and urge the gate 38 upwardly into engagement with the bottom end of an adjusting screw 44 threaded through the top cross-bar 46 which is situated over the gate 38. A suitable lock nut 48 maintains the screw 44 in its adjusted position. Thus by turning the screw 44 it is possible to regulate the distance of the bottom edge of the gate 38 above the belt 18 so that the lowermost blank 16 will pass beneath the gate 38 after which the stack of blanks 16 will fall so that the next blank at the bottom of the stack will then be fed by the feeding means 14 beyond the gate following the previously fed blanks.

Between the belts 18 and 20 is a polishing means for cleaning and polishing the blanks so that they will have perfectly smooth polished surfaces, thus providing the slide covers 36 with these high quality characteristics. For this purpose a pair of rotary brushes 50 are supported for rotation on any suitable shafts carried by suitable bearings mounted on standards carried by the base 12. FIG. 1 shows a driving motor 52 operatively connected with the shaft of the upper brush 50, the opposite end of the shaft driving a gear 54 which meshes with a gear 56 fixed to the shaft which carries the lower brush. The brushes are driven preferably with the upper brush of FIG. 2 rotating in a clockwise direction and the lower brush 50 rotating in a counterclockwise direction, so that the bristles of the brush tend to move the blanks in a direction opposite to the feeding direction indicated by the arrow 58 in FIG. 2. These brushes have lengths substantially greater than the width of the blanks so that each blank 16 is cleaned and polished by the brushes.

After passing through the brushes each blank 16 reaches the belt 20 which continues the feeding thereof in the direction of the arrow 58 shown in FIG. 2. In this way each blank is transported to the cutting location 60 just beyond the right end of the belt 20, as viewed in FIG. 2.

At the region of its right end the belt 20 is situated beneath a hold-down roller 62 carried by a pair of arms 64 which are pivoted on pins 66 carried by standards 68. The arms 64 curve upwardly at their left ends, as viewed in FIG. 2, where they are interconnected by a transverse rod 70 connected to the lower end of a spring 72. This spring is hooked at its top end to a screw 74 threaded through a bar 76 carried by a standard 78. In this way the spring 72 is maintained under tension so as to pull upwardly on the arms 64, as indicated by the arrow 80. Thus the arms 64 are urged to swing in a clockwise direction about the pivots 66, and in this way the hold-down roller 62, which may be made of rubber, for example, is urged downwardly toward the belt 20 so as to hold each slide cover blank 16 against the top surface of the belt 20.

It is to be noted that there are additional structures situated between the gate 38 and the hold-down roller 62 in order to reliably maintain the successive blanks 16 on the belts of the feeding means 14. Thus, adjacent the right end of the belt 18, as viewed in FIGS. 1 and 2, just beyond the gate 38, is a hold-down roller 82 also made of a material such as a suitable relatively soft rubber. This roller is simply supported for rotary movement on any shaft carried by the standards 84. Thus the roller 82 serves to hold the blanks on the belt 18 as the blanks move through the pair of brushes 50.

Also it will be noted from FIG. 1 that an additional elongated bar 86 acts as a weight and is situated on the successive glass blanks 16 as they travel toward the cutting location 60. This weight 86 is in the form of a smooth bar of metal or plastic through which a rod 88 passes. This rod has curved ends 90 respectively engaging stationary, vertically extending rods 92 so that the weight 86 is restrained against movement to the right beyond the position shown in FIG. 1 while the transparent glass blanks 16 move beneath the weight 86, held thereby reliably on the belt 20.

The cutting means 94 of the invention is situated at the cutting station or location 60. This cutting means includes the anvil 96 in the form of a fairly robust metal plate carried by and extending upwardly from the base 12. This anvil 96 has an upper bevelled edge 98 terminating in a relatively sharp upper edge which acts as the anvil surface of the cutting means. This upper edge of the anvil 96 coincides with the line along which the blank is cut.

Figure 3:
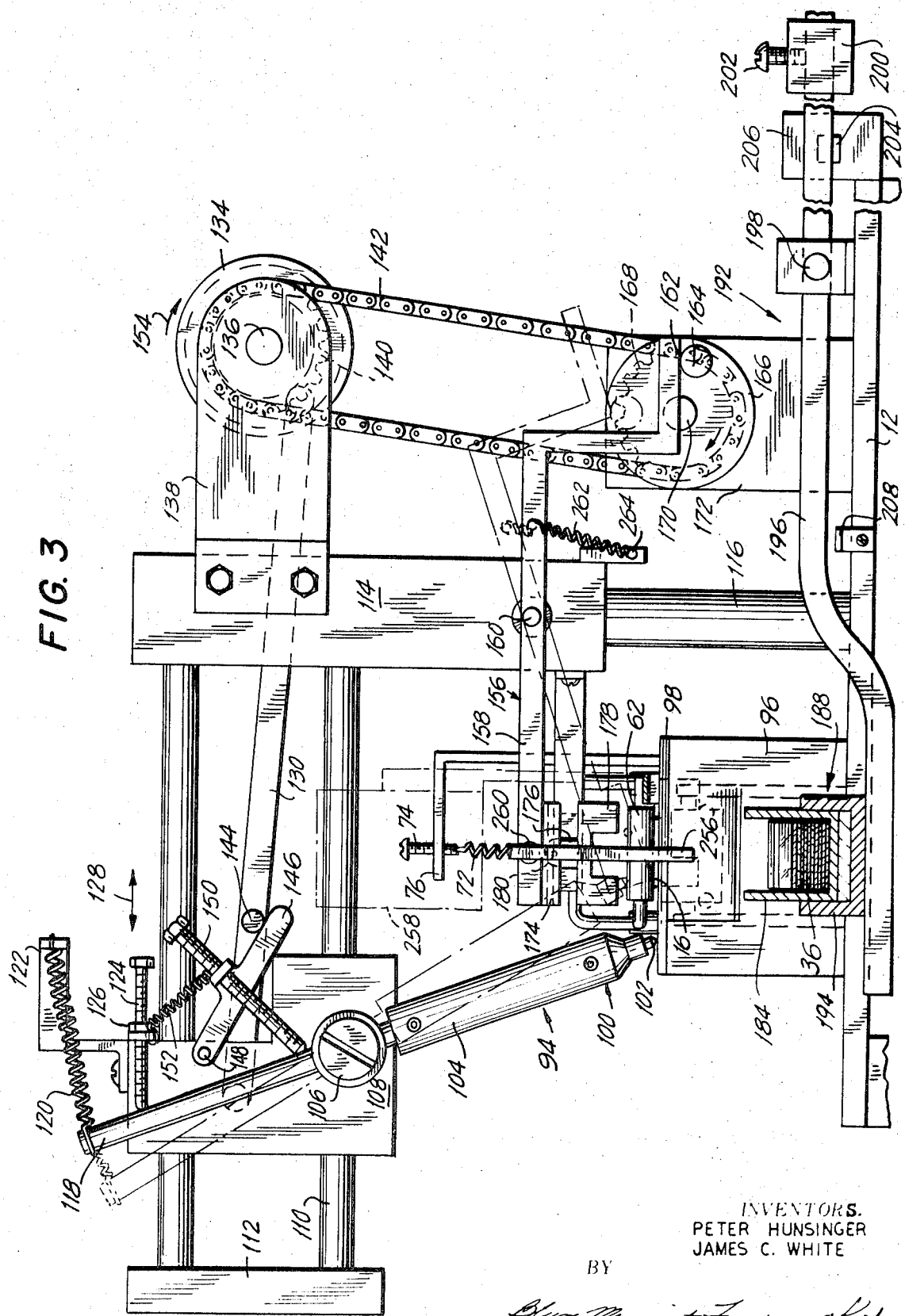
FIG. 3 is an end view of the structure of FIG. 1 taken along line 3—3 of FIG. 1 in the direction of the arrows and illustrating the cutting means and weighing means of the apparatus of the invention.
Figure 4:
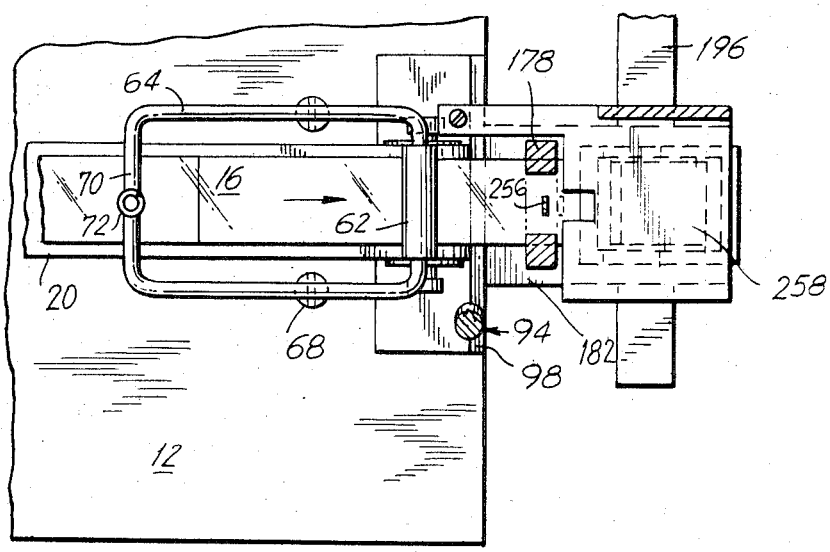
FIG. 4 is a fragmentary plan view, taken along line 4—4 of FIG. 2 in the direction of the arrows, showing the structure at the cutting location.

The cutting means 94 includes a scoring means 100 which includes a suitable scoring tool 102 fixedly carried by the lower end of an elongated supporting assembly 104 which is provided with an opening through which a pivot bolt 106 extends. As is shown in FIG. 3 this pivot bolt 106 serves to swingably mount the scoring means 100 on a carriage 108 which is formed with through-bores receiving guide rods 110. Thus the carriage 100 can slide back and forth along the rods 110. These rods are fixed at their left ends, as viewed in FIG. 3, to a vertically extending bar 112 and at their right ends to a stationary support 114. This support 114 is mounted on a post 116 carried by the base 12.

The assembly 104 includes an elongated rod portion 118 extending upwardly beyond the opening which receives the pivot 106. The top end of the rod portion 118 is fixed to one end of a spring 120 the opposite end of which is connected to a bracket 122 fixedly mounted on the carriage 108. Thus the spring 120 urges the scoring means 100 to turn in a clockwise direction, as viewed in FIG. 3, into engagement with an adjustable stop screw 124 also threaded through a bracket carried by the carriage 108. The adjustable stop 124 is held in its adjusted position by a lock nut 126. Thus, the left end of the stop 124 determines the solid-line scoring position of the scoring means 100, and this scoring means 100 is shown in this position in solid lines in FIG. 3. The scoring tool 102 scores a cutting line across the blank 16 during movement of the carriage 108 to the right, as viewed in FIG. 3, and this carriage continuously moves back and forth during operation of the cutting means 94, as indicated by the arrow 128.

In order to reciprocate the carriage 108 back and forth it is pivotally connected to one end of an elongated connecting rod 130 the opposite end of which is connected to a pin 132 carried by a rotary crank disc 134 which is supported for rotation on a shaft 136 carried by a bracket 138 which is fixed to the support 114. Coaxial with the crank disc 134 is a sprocket wheel 140 driven by a chain 142. Thus, through this drive the carriage 108 is reciprocated back and forth.

The connecting rod 130 carries a pin 144 which engages a lever 146 pivotally mounted on the carriage 108 by a pin 148. This lever 146 has a portion formed with a threaded bore receiving a bolt 150 which is in the same plane as the rod portion 118 of the swingable scoring means 100. A spring 152 urges the lever 146 in a counterclockwise direction about the pivot 148, as viewed in FIG. 3, so as to maintain the lever 146 in engagement with the pin 144.

The crank disc 134 turns in a clockwise direction, as indicated by the arrow 154. Thus, when the pin 132 moves to an elevation lower than the axis of the shaft 136 the pin 144 swings down below the pivotal connection of the rod 130 to the carriage 108, and the end of the bolt 150 engages the rod 118 so as to swing the latter and the entire scoring means 100 in a counterclockwise direction, as viewed in FIG. 3, about the pivot 106 in opposition to the spring 120, and in this way during movement of the carriage 108 to the left, as viewed in FIG. 3, the scoring means 100 is swung toward and away from the dot-dash line position shown in FIG. 3, thus retracting the scoring tool 102 to an elevation above the elevation of the top surface of each glass blank 16. In this way there will be no scoring action during the return stroke of the carriage 108 to the left, as viewed in FIG. 3. As soon as the pin 132 moves upwardly from the position shown in FIG. 3 beyond the elevation of the axis of the shaft 36, the direction of movement of the carriage 108 is reversed and the pin 144 swings upwardly to an elevation permitting the spring 152 to locate the screw 150 at a position where the spring 120 maintains the rod portion 118 in engagement with the stop screw 124, so that now scoring will take place while the pin 132 rotates in a clockwise direction around the shaft 136 at an elevation higher than the axis thereof. Thus, scoring will take place only during movement of the carriage 108 to the right, as viewed in FIG. 3.

The cutting means 94 also includes a hammer means 156 for tapping a slide cover from the remainder of the blank 16 at the top edge of the anvil 96 so as to break a slide cover from the blank. It will be noted from FIG. 2 in particular that the scoring tool 102 is situated directly above and in alignment with the top edge of the anvil 96. The hammer means 156 includes an elongated lever 158 supported between its ends on a pin 160 for swinging movement. This pin 160 is carried by the support 114. At its right end the lever 158 is stepped as to terminate in a right end portion 162 in the path of movement of a rotary pin 164 carried by a rotary crank disc 166 which is driven from a sprocket 168. The sprocket 168 and disc 166 are fixed to a rotary shaft 170 supported in any suitable bearing on a support plate 172 which is carried by the base 12. The chain 142 transmits the drive from the sprocket 168 to the sprocket 140, and the shaft 170 is itself driven in a clockwise direction, as viewed in FIG. 3, in a manner described below. The angular positions of the pins 132 and 164 with respect to the discs 134 and 166 is such that during movement of the carriage 108 to the left the pin 164 engages the end 162 of the lever 158 and swings the latter in a counterclockwise direction to the dot-dash line position shown in FIG. 3. Thus, during retraction of the scoring means 100, while the tool 102 is retracted above the elevation of the blank 16 the hammer means 156 operates.

At its left end the lever 158 fixedly carries a plate 174 formed at its lower face with a longitudinal groove receiving an upstanding ear 176 projecting from a substantially U-shaped hammer element 178. This ear 176 is pivoted to the block 174, which is fixed to the lever 158, by a pin 180. Thus, during the swinging of the lever 158 the hammer element 178 will tend to remain in its horizontal attitude shown in FIG. 3, and thus the lower ends of the U-shaped hammer element 178 will tap a slide cover 36 from the remainder of the blank 16.

As is indicated in FIG. 3, the thus-cut slide cover 36 falls onto a downwardly inclined member 182 fixed directly to the anvil 96, and the top surface of this member 182 serves to guide the successive slide covers 36 into a receptacle 184 situated at the collecting station 188 shown at the lower right of FIG. 2. At this collecting station is a means 190, described in greater detail below, for determining when a predetermined number of slide covers 36 have been collected in the receptacle 184 at the collecting station 188. While it is possible to provide a counting device for counting the number of slide covers 36 which are collected at the collecting station, in the illustrated example a weighing means 192 is provided for weighing the slide covers 36, in order to determine when a predetermined number thereof have been collected at the collecting station 188 by the collecting means 190. The collecting means 190 is simply in the form of a suitable support 194 for the receptacle 184. This support 194 is fixed, as by welding, for example, to the balance beam 196 of the weighing means 192.

The weighing means 192 includes a pivot 198 on which the balance arm 196 swings. At its right end, as viewed in FIG. 3, the balance arm 196 carries a weight 200 for controlling the swinging of the balance arm 196. Thus the weight 200 is formed with an opening receiving the balance arm 196 and it carries a set screw 202 by means of which the weight 200 can be fixed at a selected distance from the pivot 198 so as to provide the required balance. The arrangement is such that the arm 196 will automatically assume a given angular position when a predetermined number of slide covers have collected in the receptacle 184. Thus, while it is possible to provide a counting device in order to count the number of slide covers collected at the collecting means 190, with the disclosed arrangement a weighing means is provided for this purpose.

To the right of the pivot 198, as viewed in FIG. 3, the balance arm 196 extends over an arm 204 of a microswitch 206 which forms part of the control means. As long as the predetermined number of slide covers 36 has not yet accumulated in the receptacle 184, the balance arm 196 maintains the arm 204 of the switch 206 at a position where the switch is maintained open. As the slide covers 36 accumulate the balance arm rises at the switch arm 204, and when a predetermined elevation is reached at the switch arm 204 the switch 206 closes for a purpose referred to below. A stop member 208 may be situated beneath the arm 196, as shown at the lower central portion of FIG. 3, in order to limit downward swinging of the arm where the receptacle 184 is located, but before the arm 196 reaches the stop 208 the switch 206 closes to bring about automatic operations referred to below.

As was pointed out above, the shaft 170 drives the lower sprocket 168 so as to actuate the hammer means 156, and through the chain 142 the carriage 108 is reciprocated back and forth to actuate the scoring means 100. This shaft 170 is supported, as shown in FIG. 1, in suitable bearings carried by standards 210. The shaft 170 is fixed at its left end, as viewed in FIG. 1, to a driven clutch member 212.

Thus, as is apparent from FIG. 1 there are a pair of driven clutch members 32 and 212, the driven clutch member 32 transmitting a drive to the feeding means 14 while the driven clutch member 212 transmits a drive to the cutting means 94.

Between the driven clutch members 32 and 212 there is an elongated shaft 214 supported for rotary and axial movement in suitable bearings carried by a pair of standards 216 which are mounted on the base 12. This shaft 214 carries a driven friction wheel 218 made of rubber, for example. At its ends the shaft 214 carries driving clutch members 220 and 222. Between and adjacent to the driving clutch members 220 and 222 the shaft 214 carries a pair of collars 224 and 226 respectively formed with annular grooves for receiving swingable shifting forks 228 and 230, respectively. These shifting forks are supported for swinging movement on pivots 232 and 234 supported in any suitable way on the base 12. At their free ends the shifting forks are pivotally connected with an elongated shifting rod 236. This rod 236 is supported for axial reciprocation, as indicated by the arrow 238, in a suitable bearing carried by a block 240, as shown in FIG. 1.

The rod 236 is connected by a coupling 242 to the piston rod 244 of a piston which is shiftable in a double-acting pneumatic cylinder 246. In the position of FIG. 1 a solenoid valve 250 is in its unenergized position supplying compressed air to the left end of cylinder 246 through pipe 248 and venting a pipe 254 to the atmosphere to maintain the rod 244 and the rod 236 in the position illustrated in FIG. 1 where the driving clutch member 220 engages the driven clutch member 32 while the driving clutch member 222 is spaced from the driven clutch member 212. This solenoid valve 250 communicates with a source of compressed air through a pipe 252. When the solenoid valve is energized it vents pipe 248 to the atmosphere and stops the venting of pipe 254 to admit compressed air through pipe 254 to the right end of the cylinder 246 so as to shift the rod 236 to the left, as viewed in FIG. 1, and now the driving clutch member 220 is shifted away from the driven clutch member 32, so that the operation of the feeding means 14 terminates, and at the same time the driving clutch member 222 moves into engagement with the driven clutch member 212 so that the cutting means is operated.

As may be seen from FIG. 2, an actuating arm 256 of a microswitch 258 is situated in the path of movement of the leading end of the blank 16 which moves through and beyond the cutting location 60. When the leading end of the blank has moved beyond the cutting location 60 by a distance equal to the required predetermined length of each slide cover 36, the switch arm 256 is displaced to the dot-dash line position indicated in FIG. 2, and this closes the switch 258 so as to energize the solenoid valve 250. In this way the operation of the feeding means 14 is terminated and the operation of the cutting means 94 starts. The hammer lever 158 carries a button 260 which moves downwardly along the switch arm 256 when the hammer means 158 is actuated by the hammer pin 164, so that this button 260 maintains the switch 258 closed while the hammer 178 taps the slide cover 36 from the remainder of the blank in the manner described above. As is shown in FIG. 3, a spring 262 is connected at one end of the hammer lever 158 and at its opposite end to a stationary pin 264 so as to maintain the right end 162 of the lever 158 in engagement with the pin 164. Thus, it is not until the button 260 again rises to the elevation shown in FIG. 2 that the switch 258 opens to terminate the energizing of the solenoid valve 250. The return of the solenoid valve 250 to its unenergized position serves in a known way to vent the pipe 254 to the atmosphere and now air at the left end of the cylinder 246 can return the rod 236 to the right, so that the drive is again transmitted to the feeding means 14.

Figure 5:
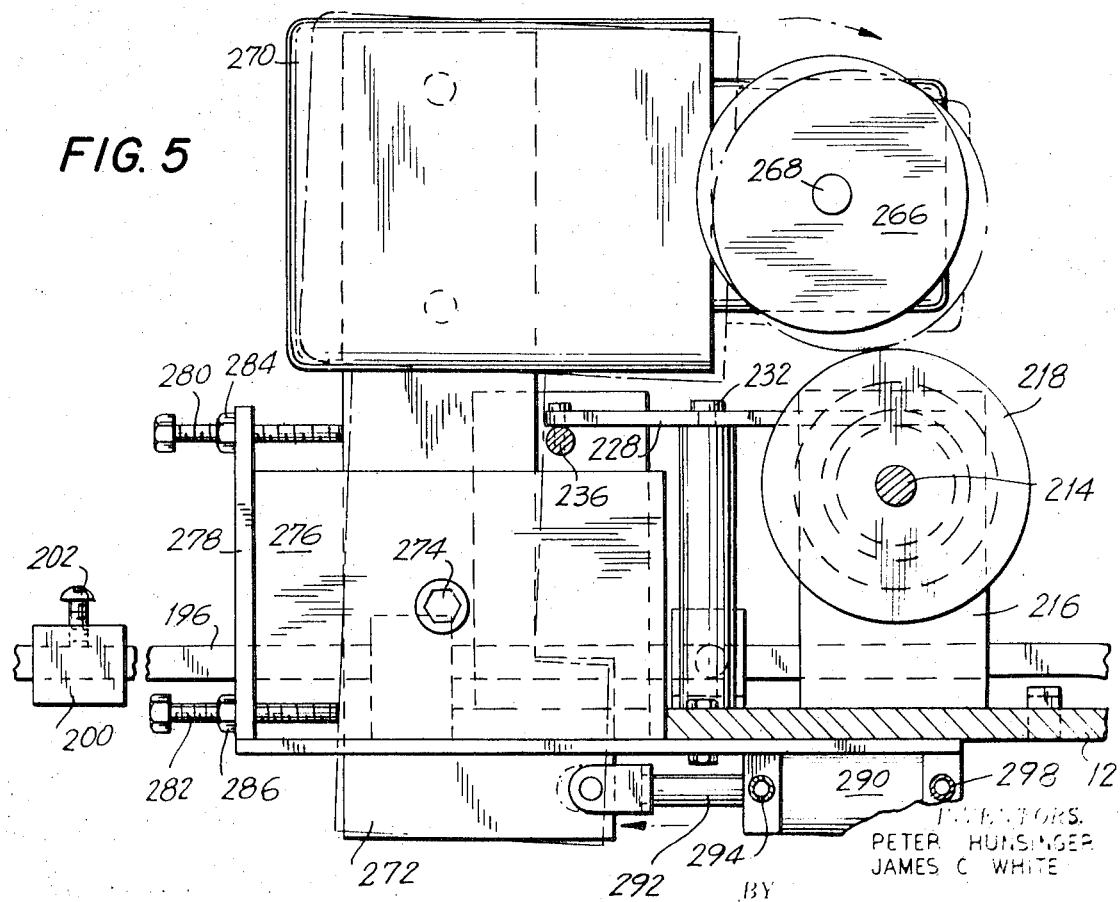
FIG. 5 is a fragmentary partly sectional elevation taken along line 5—5 of FIG. 1 in the direction of the arrows and showing the structure which drives the feeding means and cutting means, this structure being shown in FIG. 5 at a scale which is enlarged as compared to FIG. 1.

The driven friction wheel 218 is driven by a driving friction wheel 266 fixed on a rotary shaft 268 which is driven by a motor 270. As is shown most clearly in FIG. 5, the motor 270 is mounted on a tiltable support 272. This support 272 is supported for tilting movement on a pivot 274 carried by a stationary member 276. This member 276 has a wall 278 formed with threaded bores which receive stop screws 280 and 282. These screws are maintained in their adjusted positions by the lock nuts 284 and 286. The left edge of the swingable plate 272 which carries the motor 270, as viewed in FIG. 5, is swingable first into engagement with one of the screws 280 and 282 and then into engagement with the other of the screws. A double-acting air cylinder 290 is controlled by a solenoid valve 296 (FIG. 1) which when unenergized admits compressed air to cylinder 290 through a pipe 298 and vents air from the cylinder by a pipe 294 so as to urge the plate 272 into engagement with the lower screw 282. The piston in the cylinder 290 has a piston rod 292 which is pivotally connected to the mounting plate 272. In this position the driving friction wheel 266 presses against the driven friction wheel 218 so that the feeding means 14 and cutting means 94 will be alternately driven in the manner described above. However, the plate 272 can be swung into engagement with the upper screw 280 by the movement of a piston in the pneumatic cylinder 290. Pipe 294 communicates with the left end of the cylinder 290 and receives compressed air when the solenoid valve 296 (FIG. 1) is energized. At this time the other end of the cylinder 290 is vented to the atmosphere through pipe 298 by the energized solenoid valve 296.

When the microswitch 206 becomes energized upon raising of the arm 204 thereof to an elevation which is determined by swinging of the balance arm 196 to the angular position which it assumes when a predetermined number of slide covers 36 have accumulated in the receptacle 184, this energizing or closing of the switch 206 serves to energize the solenoid valve 296 so that air under pressure is now admitted from the pipe 252 through the pipe 294 to the air cylinder 290 so as to swing the plate 272 in counterclockwise direction, as viewed in FIG. 5, away from the dot-dash line position to the solid line position shown in FIG. 5 where this plate 272 engages the upper stop 280, and now the driving wheel 266 is spaced from the driven wheel 218, so that the operation of both the feeding means 14 and the cutting means 94 terminates. Thus the entire operation of the apparatus will be terminated at this time. The operator will remove the receptacle 184 with the predetermined number of slide covers 36 therein away from the collecting means 190 so as to release the balance arm 196 to the weight 200 which now again lowers the right end of the arm 196 and raises the left end of the arm 196, as viewed in FIG. 3, thus again opening the switch 206. Thus, the simple removal of the receptacle 184 with the accumulated predetermined number of slide covers 36 therein from the balance arm will automatically cause it to return to a position opening the switch 206 so that now the pipe 294 will be vented to the atmosphere upon deenergizing of the solenoid valve 296, and compressed air delivered through pipe 298 will return the driving friction wheel 266 into engagement with the driven friction wheel 218, as shown in FIG. 5, so that the operating cycles will continue. Of course, immediately upon removal of one filled receptacle 184 the operator places an empty receptacle 184 on the collecting means 190, and at this time the stop bar 208 will limit the downward movement of the balance beam 196 by the operator while the switch 206 remains closed. The position of the weights 200 is such that with an empty receptacle 184 on the balance arm 196 this beam will nevertheless swing in a clockwise direction, as viewed in FIG. 3, to an angular position where the switch 206 will open. It is only upon accumulation of a given number of slide covers 36 in the receptacle 184 that the arm 196 assumes the angular position which will automatically close the switch 206.

As is apparent from FIG. 1, a plurality of the shiftable weights 200 may be mounted on the arm 196 for precisely balancing the latter to bring about automatic closing of the switch 206 when a predetermined number of slide covers 36 have accumulated in the receptacle 184.

Figure 7:
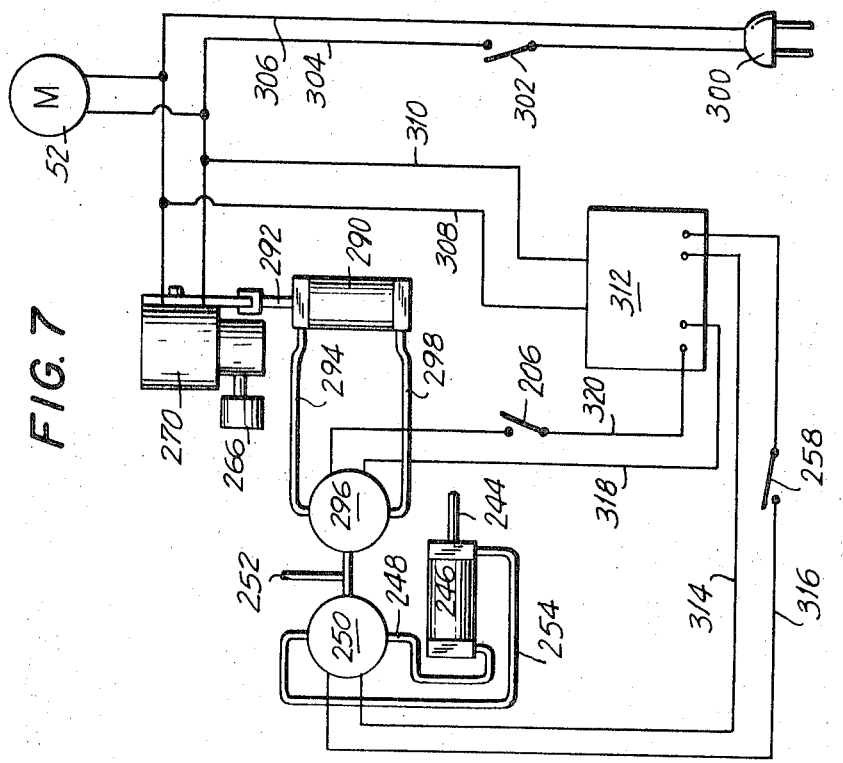
FIG. 7 is a schematic illustration of the electrical control means and the pneumatic structure controlled thereby.
Figure 6:
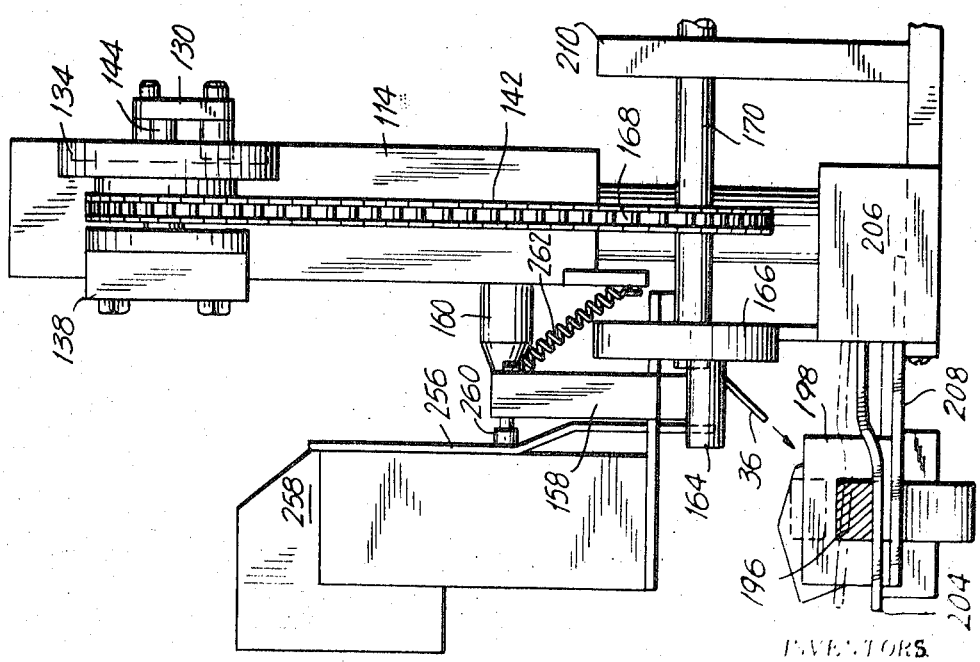
FIG. 6 is a partly sectional elevation taken along line 6—6 of FIG. 1 in the direction of the arrows and illustrating further details of the cutting means and weighing means, the scale of FIG. 6 also being enlarged as compared to FIG. 1.

The control means of the invention is schematically illustrated in FIG. 7. The electrical lines can be connected to any wall outlet by way of a plug 300. The circuit includes a master switch 302 for turning the entire apparatus on and off. It will be noted that the motor 52 which drives the brushes 50 will operate as long as the switch 302 is closed. Also the motor 220 will operate as long as the switch 302 is closed. The lines 304 and 306 connected to the motors 252 and 270 are connected by conductors 308 and 310 to a panel 312 through which the conductors 314 and 316, which are connected to the solenoid valve 250, are connected into the circuit and through which the conductors 318 and 320, which are connected to the solenoid valve 296, are connected into the circuit. The microswitch 258 is shown in the line 316 and the microswitch 206 is shown in the line 320. Thus, upon closing of the microswitch 258 by the leading end of the blank 16 the solenoid valve 250 will be energized while the closing of the microswitch 206 by accumulation of the predetermined number of slide covers in the receptacle 184 will energize the solenoid valve 296.

It is thus apparent that with the method and apparatus of the present invention there is a fully automatic operation according to which cycles, each of which includes feeding of a blank and cutting of a slide cover therefrom, are automatically operated repeatedly until a predetermined number of slide covers 36 have accumulated at the collecting station, whereupon the operations are terminated automatically by raising of the driving friction wheel 266 away from the driven friction wheel 218. Upon removal of the collected predetermined number of slide covers the operations will automatically resume as pointed out above.

After a predetermined number of slide covers 36 have been removed they may be packed in any suitable way for shipment to any desired location.

As is apparent from the above description with the method and apparatus of the present invention all that the operator need do is maintain the number of blanks 16 at the stack to the left of the gate 38 and replace a full receptacle 184 with an empty receptacle. With these minimal manipulations it is possible to automatically achieve slide covers 36 of exceedingly high quality and precisely determined dimensions.

As was pointed out above, a mechanical counting mechanism may be used to count the number of slide covers, instead of using the above weighing mechanism. Such a mechanical counting mechanism may be mechanically tripped each time the cutting means 94 operates. For example, the reciprocating carriage or any other part such as the hammer arm or scoring means may trip a counter once during each operating cycle. The number of times the counter is tripped will equal the number of slide covers accumulated. The counter is set to close the microswitch 206 when a predetermined number has been reached. Upon removal of a receptacle with the predetermined number of slide covers therein the operator will return the counter to its zero position so as to open the switch 206, and the feeding and cutting operations will start again to continue until the predetermined number is again reached. It is to be noted that a static eliminator 350 is situated over the belt 20 above the blanks 16 just in advance of the cutting location 60.

What is claimed is:

1. In an apparatus for manufacturing slide covers, feeding means for successively feeding elongated blanks longitudinally through and beyond a predetermined cutting location, cutting means located at said cutting location for cutting a slide cover from a blank which extends through and beyond said cutting location, control means for responding automatically to movement of each blank through and beyond said cutting location and operatively connected to said feeding means and cutting means for automatically terminating the operation of said feeding means when a predetermined length of each blank extends beyond the cutting location and for then operating the cutting means to cut a slide cover of said predetermined length from each blank and said control means then again starting the operation of said feeding means at the end of the operation of said cutting means so that said control means automatically carries out successive cycles during which each blank is first fed and then cut for automatically deriving slide covers of predetermined length from blanks successively fed by said feeding means, and a collecting means situated in the region of said cutting means for collecting slide covers successively cut from said blanks, said control means being operatively connected with said collecting means for terminating the operation of said feeding means and cutting means when a predetermined number of slide covers have been collected by said collecting means and for again resuming the operation of said feeding means and cutting means when the predetermined number of slide covers have been removed from the location of said collecting means, so that said predetermined number of slide covers will again be collected by said collecting means.

2. The combination of claim 1 and wherein said collecting means weighs the blanks collected thereby, said control means responding to a predetermined weight of collected blanks for terminating the operation of said feeding and cutting means.

3. In an apparatus for manufacturing slide covers, feeding means for successively feeding elongated blanks longitudinally through and beyond a predetermined cutting location, cutting means located at said cutting location for cutting a slide cover from a blank which extends through and beyond said cutting location, control means for responding automatically to movement of each blank through and beyond said cutting location and operatively connected to said feeding means and cutting means for automatically terminating the operation of said feeding means when a predetermined length of each blank extends beyond the cutting location and for then operating the cutting means to cut a slide cover of said predetermined length from each blank and said control means then again starting the operation of said feeding means at the end of the operation of said cutting means so that said control means automatically carries out successive cycles during which each blank is first fed and then cut for automatically deriving slide covers of predetermined length from blanks successively fed by said feeding means, a pair of drives respectively connected operatively to said feeding means and cutting means for driving the latter, said control means including a clutch means and a primary drive means for transmitting drives through said clutch means to said pair of drives, and said control means displacing said clutch means between one position where said clutch means disengages the transmission of a drive to the drive operatively connected to said cutting means and transmits the drive to the drive operatively connected to said feeding means and a second position where said clutch means terminates the transmission of a drive to the drive operatively connected to said feeding means and transmits the drive to the drive operatively connected to the cutting means, and a collecting means located in the region of said cutting location to collect slide covers cut from the blanks, said collecting means including a receptacle and a balance arm carrying said receptacle to be tilted to a given angular position depending upon the number of covers deposited in said receptacle of said collecting means, said control means including a switch actuated by said balance arm and operatively connected to said primary drive means for terminating the transmission of a drive therefrom to said clutch means when the balance arm reaches a given angular position corresponding to a predetermined number of covers in said receptacle, the removal of said receptacle from said balance arm returning the latter to a position actuating the latter switch for again resuming the transmission of a drive from said primary drive means to said clutch means.

4. The combination of claim 3 and wherein said primary drive means includes a driving motor, a friction drive wheel driven thereby, and a driven wheel operatively connected with said clutch means to be driven by said friction drive wheel, support means supporting said motor for tilting movement between positions where said friction drive wheel is engaged with and is spaced from said driven wheel, and pneumatic means operatively connected with said motor for tilting the latter between said positions, said pneumatic means being actuated by the switch which responds to movement of said balance arm for tilting said motor to a position displacing said driving friction wheel from said driven wheel when said predetermined number of covers have been collected at said receptacle and for returning said friction drive wheel to engagement with said driven wheel when the receptacle with the covers therein have been removed from said balance arm.

References Cited
UNITED STATES PATENTS

| | | | |
|---|---|---|---|
| 2,051,698 | 8/1936 | Gaskell | 225—96.5 |
| 3,216,635 | 11/1965 | Lefevre | 225—96.5 |
| 3,279,548 | 10/1966 | Boukair | 177—60 |

FRANK T. YOST, Primary Examiner

U.S. Cl. X.R.

83—77, 367, 372; 177—245; 225—93